(12) United States Patent
Sandberg et al.

(10) Patent No.: US 6,565,668 B1
(45) Date of Patent: May 20, 2003

(54) METHOD AND DEVICE FOR THE CLEANING OF ANIMAL STALLS

(76) Inventors: Jan Sandberg, Lund, Ramsta, S-755 91 Uppsala (SE); Bjarne Graff, Ramsta, S-755 91 Uppsala (SE); Anders Lif, Focksta, Uppsala Nas, S-755 91 Uppsala (SE)

(*) Notice: Subject to any disclaimer, the term of this patent is extended or adjusted under 35 U.S.C. 154(b) by 0 days.

(21) Appl. No.: 09/857,194
(22) PCT Filed: Dec. 22, 1999
(86) PCT No.: PCT/SE99/02471
§ 371 (c)(1),
(2), (4) Date: Jun. 21, 2001
(87) PCT Pub. No.: WO00/36904
PCT Pub. Date: Jun. 29, 2000

(30) Foreign Application Priority Data

Dec. 22, 1998 (SE) ............................................... 9804508

(51) Int. Cl.⁷ ............................ B05B 3/00; B05B 15/08; B08B 3/02; B08B 9/00; B08B 9/093
(52) U.S. Cl. ..................... 134/18; 134/22.1; 134/22.18; 134/24; 134/57 R; 239/DIG. 15; 239/261; 239/587.1; 239/587.2; 239/722
(58) Field of Search ...................... 134/18, 22.1, 22.18, 134/24, 57 R; 239/DIG. 15, 159, 160, 176, 227, 261, 264, 587.1, 587.2, 722

(56) References Cited

FOREIGN PATENT DOCUMENTS

| DE | 2031361 A1 | 5/1972 |
|----|------------|--------|
| EP | 0496983 A1 | 8/1992 |
| EP | 0943235 A2 | 9/1999 |
| SE | 509443 C2  | 1/1999 |
| WO | 9300261 A1 | 1/1993 |
| WO | 9309880 A1 | 5/1993 |

*Primary Examiner*—Zeinab El-Arini
(74) *Attorney, Agent, or Firm*—Bacon & Thomas

(57) ABSTRACT

The device relates to a method for the cleaning of animal stalls, which have a number of spaces that are to be cleaned by means of an automatic clean device. The method is characterized by the steps of (a) positioning the device in a parking position, in which the device can reach into and clean a first space, (b) cleaning of the first space through manual controlling of the device, (c) the repetition of steps (a) and (b) until all the spaces in the premises which are to be cleaned have been cleaned by the device, programming the device with the movements which were performed during the above-mentioned steps, by means of signals representing these movements which are supplied to a control unit, through registering the movements performed by storage of the steps in a memory which is provided in a control unit which is part of the device, and the use of the contents of the memory during the next cleaning of the same animal stall as a program for the control unit for the automatic controlling of the device.

14 Claims, 3 Drawing Sheets

METHOD AND DEVICE FOR THE CLEANING OF ANIMAL STALLS

This is a national stage application of PCT/SE99/02471 filed Dec. 22, 1999.

FIELD OF THE INVENTION

The present invention relates to a cleaning device, and specially an automatic cleaning device, which can be used for the cleaning of animal stalls, for example pigsties.

STATE OF THE ART

Today the cleaning of pigsties is a considerable problem for those who work with pig breeding. Pigsties have to be cleaned a fixed number of times per year and during the intervening time a lot of dung collects and packs down and forms a layer, which is extremely hard and difficult to remove.

According to the state of the art, during cleaning a so-called mist sprayer is used to wet, for example a pigsty or some other space which is to be cleaned. This can, for example, be switched on during the night so that when the working day begins the space that is to be cleaned and, in this case, especially the material in the pigsty in the form of solidified dung, which is to be removed, is properly moistened. Subsequently the space is cleaned manually through rinsing, for example with high-pressure water, possibly using some kind of cleaning material.

This work is fairly time-consuming because the material which is to be removed often is extremely firmly attached and when the material has been removed from the surface it has to be shovelled out into collection containers and removed from the premises. Quite apart from that the work is heavy and time-consuming, in the case of cleaning of pigsties and other animal living quarters it is extremely unhealthy. The gases and the mist that is formed when the material is wetted contain large amounts of ammonia and other harmful substances. Breathing in of these substances during cleaning often leads to long periods of time on the sick list with fever, nausea and possible allergic reactions, after the cleaning work. In order to avoid these it has been suggested to provide automatic cleaning arrangements in order to perform the manual work. A known device slowly travels forward in a pathway in an animal stall. The device sprays high-pressure water into the spaces on both sides of the device which are to be cleaned, by means of long arms provided with nozzles through which the high-pressure water is sprayed. It however suffers from a number of problems.

In the first instance, this construction with long spray arms is not very suitable for use in, for example pigsties where there are a large number of water pipes, ventilation pipes, and other construction elements which make it difficult for this device in the first instance to advance and in the second instance to approach to make things clean, for example in so called suckling boxes where a large number of feed tubes and water tubes are arranged. Because the device constantly moves forward, it is furthermore completely dependent on that the passage in which it is moving is completely free from details such as pipes, ducts and the like, on the one hand for accessibility and on the other hand so that the arms will not be obstructed during the cleaning.

The biggest disadvantage with this known device is, however, that the cleaning that it is capable of performing is not sufficient in order to deal with the extreme soiling which can occur with the keeping of pigs. The device sprays water or another cleaning fluid to the sides in a random way in comparison with cleaning which is performed manually. In order to remove the hardened dirt the streams of cleaning fluid must be directed to the layers for a longer period of time in order to loosen the dirt, which the known device is not capable of doing.

The above-mentioned disadvantages with the known device make it fairly uninteresting for an ordinary pig farm, or another space which is to be cleaned, because as a result of its construction and its way of working, it is not able to perform the work which is normally performed manually, because, for example, the requirements of free space in, for example, the dung trough in a pigsty, which is required for a good function, is seldom, or never, present.

A central problem for such a device is that, as mentioned above, the cleaning must take place through prolonged treatment with a high-pressure jet of water or another cleaning fluid on the ingrained dirt until it has loosened.

A further problem, which is discussed above, is that the cleaning often is difficult because of obstacles in the shape of tubes and other devices are present in the space that is to be cleaned.

It consequently would be desirable to provide a device for automatic cleaning of above all pigsties, but even other spaces or premises which require a great deal of work during cleaning, which is capable of handling the above-mentioned problems in order to improve the working environment for those who work with, for example, pig breeding.

OBJECT OF THE INVENTION

Consequently, it is therewith an object of the present invention to provide a method for automatic cleaning and an automatic cleaning device, which has satisfactory capacity in-order to be able to completely automatically clean, for example, a pigsty, or other animal stalls.

A further object with the present invention is to provide a method and a device which is especially suitable for the cleaning of such premises, which have problems with a large number of spaces with different appearances which require cleaning to be adapted for each space. An example of this, in connection with pigsties, is the fact that the individual boxes are different depending on factors such as the positioning of gates, ventilation ducts, walls and if it is a question of so-called suckling boxes where the piglets are born. These boxes are filled with a number of pipes and other devices which make cleaning extra complicated.

A further object with the present invention is to provide a method and a device which is capable of cleaning spaces, above all pigsties, where the dirt which is to be removed is firmly attached and must be removed through directed and prolonged treatment with high-pressure cleaning fluid.

THE INVENTIVE OBJECT

The above objects are achieved in accordance with the invention by a method for automatic cleaning of, for example, pigsties, by means of an automatic cleaning device having driving means, cleaning means and a control unit.

DESCRIPTION OF THE ILLUSTRATIVE EMBODIMENTS

Figure 1A:
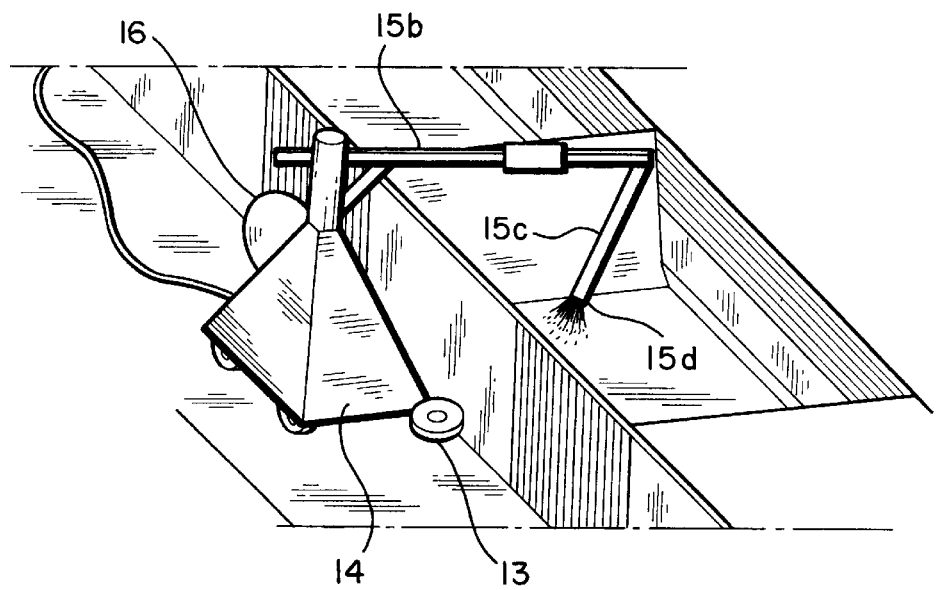
FIGS. 1a–d are schematic perspective views of an embodiment of the present invention in operation during cleaning of a conventional pigsty.
Figure 1B:
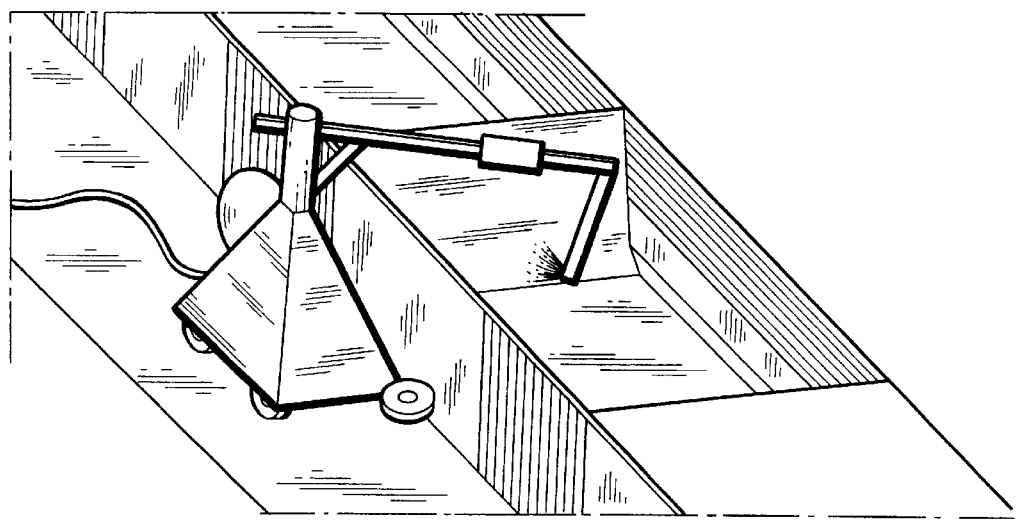
Figure 1C:
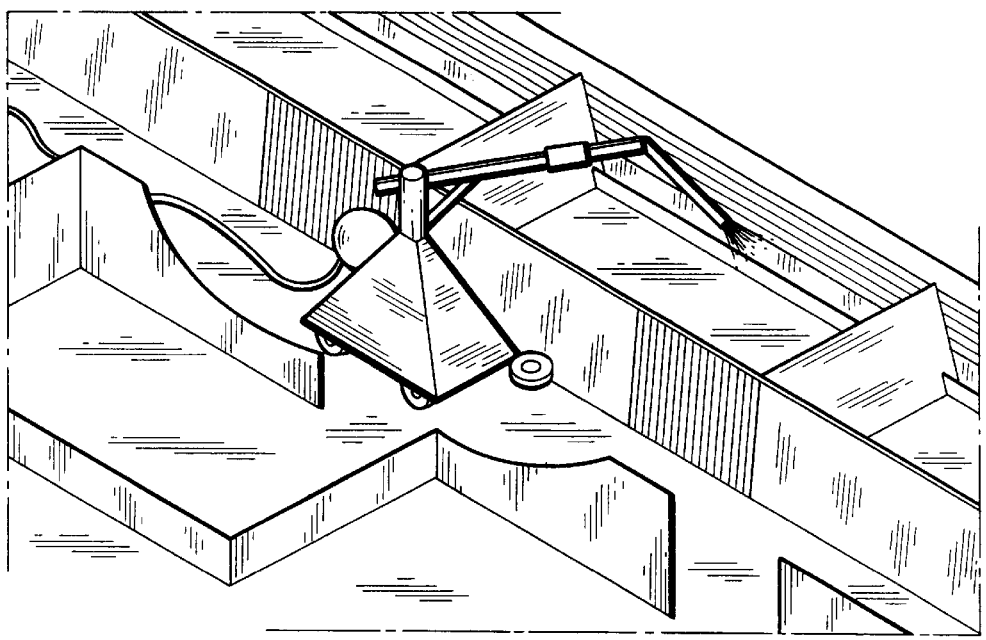
Figure 1D:
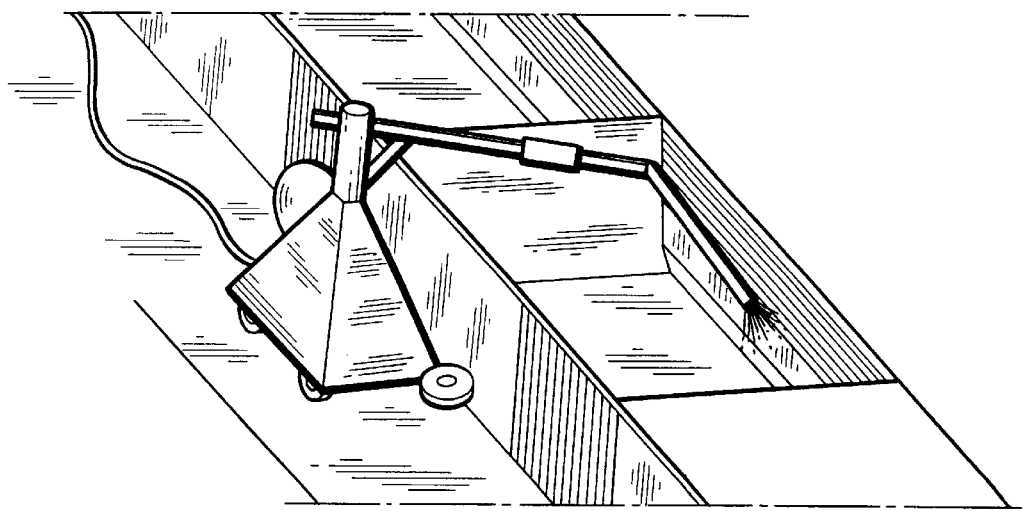
Figure 2:
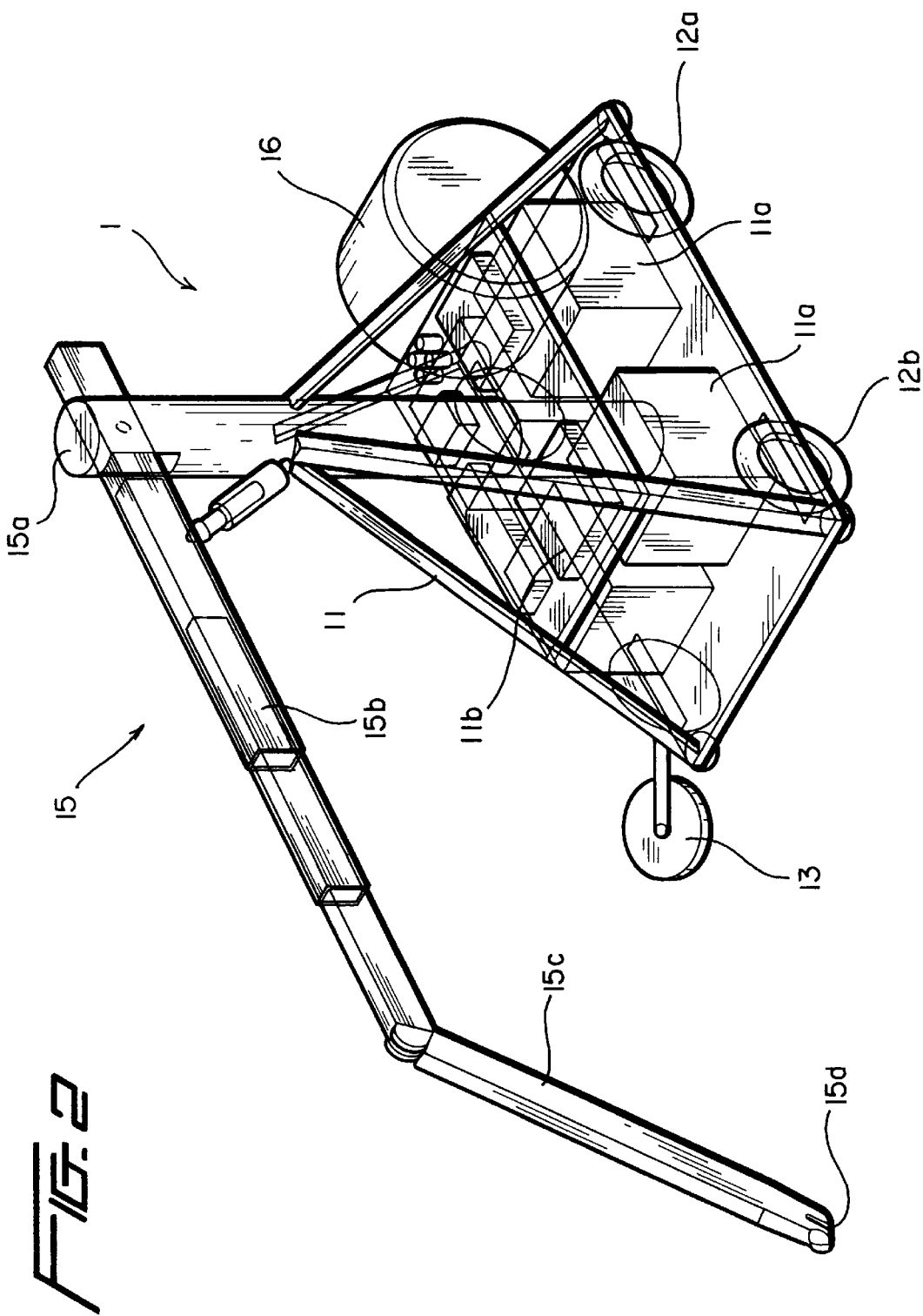
FIG. 2 is an exploded diagram that shows schematically an example of a device according to the present invention.

FIGS. 1 and 2 show a cleaning device, or cleaning robot, having a general reference symbol 1, in accordance with the invention for, for example, pigsties or other animal stalls, which require the application of a large amount of work during cleaning. It comprises a chassis 11, two pairs of wheels 12a and 12b, a supporting wheel 13, a casing 14 under which the necessary means for its operation are arranged, a cleaning arm 15 and a hose windlass 16.

The chassis 11 carries the batteries 11a necessary for its operation, which are arranged approximately at the same level as the pairs of wheels in order to obtain a centre of gravity which is as low as possible, which gives the necessary advantage that it makes the robot 1 stable. In an embodiment of the invention the batteries 11a consist of four conventional 12V-batteries. These batteries are used for the drive of the robot's driving means, for example conventional DC-motors, for driving one or both of the pairs of wheels 12a and 12b. The chassis 11 further supports one or more bearing-off means 13, the function of which will be described below. Furthermore, there is a control unit 11b arranged there for controlling the movements of the robot 1. Furthermore an automatic hose windlass 16 is arranged on the chassis, which contains the hose through which the cleaning fluid, preferably water, is led under high-pressure for cleaning. The hose windlass 16 is so constructed that it rolls out as much hose as is required between the cleaning device 1 and the connection from which the high-pressure cleaning fluid is taken out—this is in order to avoid that too much hose lies on the floor and thereby risks being damaged and made dirty unnecessarily.

The bearing-off means in the embodiment shown comprises two support wheels 13, which can be of the same type as those in the pairs of wheels 12a, 12b upon which the robot rolls. The support wheels 13 have been arranged on the sides of the casing 14 and are intended to roll against a delimitation, for example a wall, a fence or the like in the space which is to be cleaned, against which the robot runs. In this way, the robot can be made to hold a constant course through it being guided lightly against the delimitation and, by means of supporting means 13, bearing-off against said delimitation, see FIG. 1.

The robot 1 further has a cleaning arm 15, which is a jointed arm with, in the embodiment shown, three arm elements, a first, inner arm element 15a which is connected to the chassis, a second intermediate arm element 15b and a third, outer arm element 15c. The arm ends with a nozzle part 15d, which has at least one nozzle through which high-pressure cleaning fluid can be sprayed. The supply of fluid to the nozzle is ensured by a hose or other suitable piping which runs along the parts of the cleaning arm and which is connected with the automatic hose windlass 16 either through being connected to this or through the hose being a continuation of the hose, which runs in the hose windlass.

The sub-arms of the cleaning arm 15 are mutually connected by means of joint means, which are provided with electric motors (not shown), preferably low voltage motors, so that the mutual positions of the sub-arms are able to be adjustable by means of said motors. The nozzle is also rotatable by means of electrical driving means. In this way the cleaning arm's 15 position is so adjustable that it can reach all conceivable spaces within its range, which is shown in the example in FIGS. 1a–d.

It is naturally possible to provide the cleaning arm with more or less arm elements than the three that are shown here. It is also understood that it is conceivable to arrange more than one nozzle part, for example three parts depending on what is determined to be suitable.

The joint means of the cleaning arm 15 are further provided with position and/or movement registering means (not shown), which are capable of registering a position in which a joint is in as function of time, or a movement which a joint driving means has performed.

Furthermore, the automatic cleaning device in accordance with the present invention is provided with a control unit 11b, which is fed by the available low voltage source. It is provided with the necessary operating means, for example, a switch, for a first, manual position in which the robot is guided by means of external handheld control means, for example a joystick, and an automatic position in which the control unit executes a program stored in it. The control unit is consequently a programmable control unit and is particularly intended to be programmed with a pattern of movement. The above-mentioned position and/or movement registering means are connected to a first input on the control unit and by means of signals give the control unit information about the positions that the respective joints are in. A second input is connectable to an external handheld control unit, for example a joystick. The control unit also has a third input to which a microcomputer or other suitable programming equipment or displaying equipment can be connected. The control unit also has outputs from which control signals from the control unit are led to the manoeuvring and driving means, which drive the movement of the robot's different means, such as the cleaning arm and the drive wheel.

The automatic cleaning device in a preferred embodiment is provided with some type of sensor for sensing or recognising certain predetermined positions, which are below called parking positions, along its path of movement, which sensor produces a signal when the device has reached such a position.

A method in accordance with the invention for cleaning by means of an automatic cleaning device will now be described.

When an automatic cleaning device is to be used to perform cleaning work in a pigsty, as mentioned in the introduction it is not sufficient to spray high-pressure water randomly in the boxes. In order to remove all dirt, or at least to loosen it from the floor and walls, it is necessary that the high-pressure spray is directed towards, and preferably under, the layer or caking of dung or other filth which has formed in a box, whereafter this must be treated for a long period of time. When this is done manually, the dirt is treated by a hose operator until the layer loosens, whence it can be removed from the box, usually by means of a spade and wheelbarrow.

In accordance with the present invention, a cleaning robot which can be programmed to clean, for example, pigsties or other spaces which are to be cleaned is provided. This programming takes place through those who normally clean the space, by means of a joystick or other control equipment, cleaning the space through operating the driving device manually. Consequently, the operator performs a normal cleaning with the help of the robot, which is driven in the manual state by the above-mentioned joystick or other control means.

The programming operation begins with the device in a starting position where it is placed beside a wall in, for example, a passage between two rows of boxes in a stall. The device is first driven forward to a place where it can reach in to clean a first space, for example, a pig box. The device is parked in this position, which below is called the parking position. Thereafter the operator performs the cleaning of the space with help of the device, the cleaning arm of which is driven, in the above-mentioned way, for example, by means of a joystick, in order to, by means of a high-pressure stream of water coming from the nozzle of the device, rinse away the dirt which is in the space. When the space has been cleaned to a suitable extent the cleaning arm is retracted from its extended cleaning position and the device is driven to a new place where it can reach in to clean a new space, or a second parking position. Here the operator repeats the same procedure as for the first space until the second space is also cleaned to the desired extent. This is continued until all the spaces in the premises have been cleaned. The device thereafter stops and the cleaning is concluded.

The position and/or movement detecting means on the device give rise to signals, which are sent to the robot's control unit where they are stored. In this way, the robot is programmable for the cleaning of premises, for example a pigsty or other animal stall, consisting of a number of small spaces, for example boxes, through the cleaning program being operated manually a first time. When the premises are to be cleaned the next time the operator only needs to start the robot, which thereafter executes the same program again.

As it is usual that premises, for example animal stalls, are made dirty in certain fixed places it is in general sufficient with one learning-process for the robot to be able to manage the time-consuming coarse cleaning. After the coarse cleaning even with manual cleaning there remains a certain amount of follow-up work after that which has been loosened by the coarse cleaning has been removed. The saving of time in hours of labour is reasonably large, but above all the device performs the rinsing work, which is so damaging to health, which was one of the main goals of the invention. The coarse cleaning by means of the invention can take place at night, and the follow-up work, which in scope is a small part of the time consumed, can be performed by personnel in the daytime.

In the case that the automatic device should stop during an automatic cleaning, an alarm device is preferably provided which through ringing up of a personal pager, or some other suitable way, communicates that the running of the program has been interrupted.

According to an alternative embodiment, the robot's control unit is programmed without running through the program manually. This method can be preferred in extremely dirty environments where the risk for work-related injuries or illness after manual cleaning is extra high. Because the operator in this case cannot follow the robot's cleaning and see the result, the result must be evaluated after the cleaning has been performed and the program corrected for possible deficiencies with respect to the result of this cleaning.

For the possible correction of the cleaning pattern the device can be connectable to means, which also can be used during programming of the robot according to the alternative embodiment, which illustrate the movements of the robot and makes it possible to step virtually through the robot's cleaning program, and therein, that is to say without needing to operate the robot in real life, perform the desired changes.

In this way the problems mentioned in the introduction are solved by means of a method and a device for automatic cleaning of animal stalls. Naturally, modifications can be made to the above-described examples without departing from the inventive concept. For example, the device can be provided with means for automatic guidance so that it can steer around obstacles and the device's parking positions can be indicated in many different ways, for example through a revolution counter, which counts the number of revolutions that the drive wheels of the device rotate, or through photocells or in some other suitable way. Furthermore, the mutually jointed sub-arms can be driven by hydraulic cylinders instead of electric motors or with help of other suitable drives.

What is claimed is:

1. A method for cleaning animal stalls by means of an automatic cleaning device having a moveable cleaning arm, characterized in that said method comprises the steps of:
   (a) placing the device in a parking position in which the cleaning arm of the device can reach into a first stall to be cleaned in order to clean said first stall by movement of said arm having a nozzle part with at least one nozzle for a high pressure cleaning fluid;
   (b) cleaning said first stall through manually operating controls for the movement the device and said cleaning arm and said high pressure cleaning fluid,
   (c) repeating steps (a) and (b) for each animal stall to be cleaned,
       programming by recording and storing in a memory provided on a control unit on the cleaning device, signals representing the movements performed by the cleaning device during the cleaning of each stall, and
       using said stored signals in said memory during a subsequent cleaning of the same stalls as a program for the control unit for automatic guidance of the device and cleaning of the stalls.

2. The method according to claim 1, characterised by performing the programming through manually driving the device by means of a handheld operating unit, wherein the recorded signals are directly supplied to the control unit.

3. The method according to claim 2, characterised in that the program, used to automatically guide the cleaning device is corrected by means of a computer connected to the control unit, said computer illustrates the cleaning program and makes it possible for an operator to override the program and perform any necessary corrections.

4. The method according to claim 1, characterised in that the program, used to automatically guide the cleaning device is corrected by means of a computer connected to the control unit, said computer illustrates the cleaning program and makes it possible for an operator to override the program and perform any necessary corrections.

5. An automatic cleaning device (1) for animal stalls, comprising
   a chassis (11) having two pairs of wheels (12a, 12b), at least one of which is drivable by means of a drive device connected thereto,
   a nozzle part (15d) for spraying cleaning fluid,
   characterized in that the device further comprises a cleaning arm (15) having first and second ends, wherein said cleaning arm (15), at said first end, is attached to the chassis (11) by a joint, and wherein a nozzle part (15d) is connected to the second end of the cleaning arm (15), said cleaning arm having joint means and position and movement registering means for determining position of the arm as functions of time, said cleaning device is provided with driving means for bringing the arm into movement, the nozzle being connected to a supply of cleaning fluid, and wherein the device is provided with a programmable control unit (11b), which is provided with inputs for receiving signals from the position and movement registering means and means for detecting parking positions, said position and movement registering means and means for detecting parking positions are connected to said inputs, a memory for the storage of the signals in the form of a program, and outputs for sending control signals to the devices means for driving the drive wheels as well as to the driving means for the cleaning arm's (15) function and movements, whereby the control unit controls the function of the device (1) in accordance with a pattern of movement programmed in advance, wherein the control unit controls both the driving wheels, and movements of the cleaning arm (15) and the nozzle part (15d).

6. The device according to claim 5, characterized in that the control unit in addition to said inputs also has an input for control signals from an external control unit.

7. The device according to claim 5, characterized in that the control unit is provided with outputs and inputs respectively for transferring signals between the control unit and a computer connected to the control unit.

8. The device according to claim 5, characterized in that the device, on a side of the chassis which faces a stall along which the device is driven is provided with at least one bearing-off means (13) which bears off against a portion of the stall, whereby the drive wheels are so directed that the device is steered at an angle towards the portion of the stall and thereby rolls along the stall guided by the bearing-off means (13).

9. The device according to claim 5, characterized in that a high-pressure cleaning fluid supply line to the nozzle is connected to an external source containing cleaning fluid via a hose, wherein said hose is rolled up on an automatic hose windlass (16), said windlass (16) is so constructed that it automatically rolls out the hose the required length between the cleaning device and the external source with cleaning fluid and winds in the hose if the length of the hose exceeds a required length.

10. The device according to claim 5, characterized in that the device is provided with an alarm device system which emits one or more warning signals that communicates that the device's automatic operation in some way has been interrupted.

11. The device according to claim 5, characterized in that the cleaning arm (15) has three sub-arms (15a, 15b, 15c), wherein a first inner sub-arm (15a) is attached by a joint to the chassis (11), a second intermediate arm (15b) which at one end is connected to the first inner sub-arm (15a) and at its second end is connected to a third sub-arm (15c), wherein the nozzle part (15d) is connected to the outer third sub-arm (15c) and wherein the sub-arms are mutually connected by joint means, all of said sub arms are provided with position and movement registering means for determining the sub arms respective positions as functions of time, and which furthermore are provided with driving means for bringing the sub-arms into movement in relationship to each other.

12. The device according to claim 11 characterized in that all of said join means are provided with position and movement registering means.

13. The device according to claim 5, characterised in that the nozzle part (15d) is provided with two or more nozzles, directed in different directions.

14. The device according to claim 5 characterized in that said joint means are provided with position and movement registering means.

* * * * *